Figure 1:
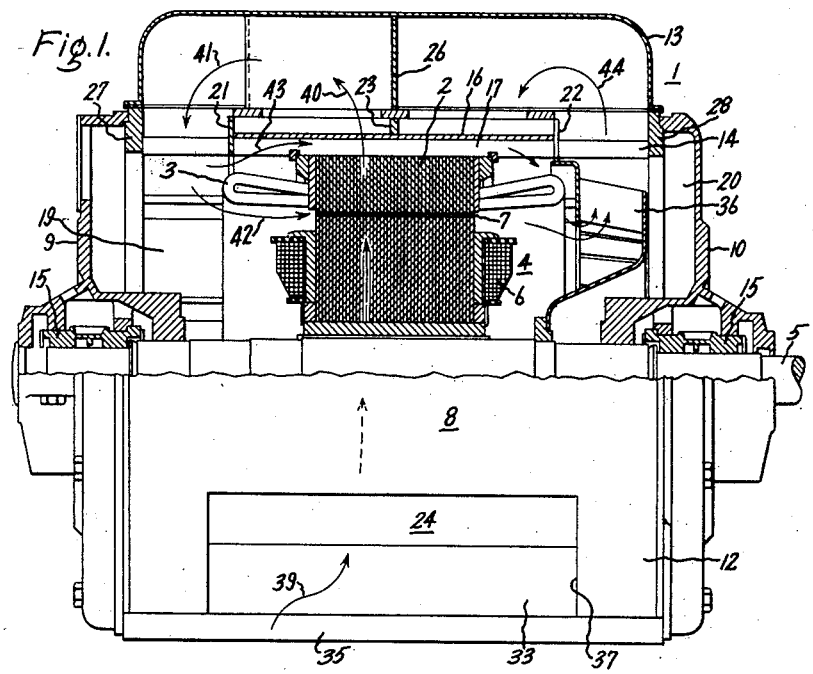

Dec. 2, 1952 L. A. MARCH 2,620,449
DYNAMOELECTRIC MACHINE
Filed Jan. 18, 1951 3 Sheets-Sheet 1

Inventor:
Laurel A. March,
by Ernest C. Britton
His Attorney.

Dec. 2, 1952 L. A. MARCH 2,620,449
DYNAMOELECTRIC MACHINE
Filed Jan. 18, 1951 3 Sheets-Sheet 2
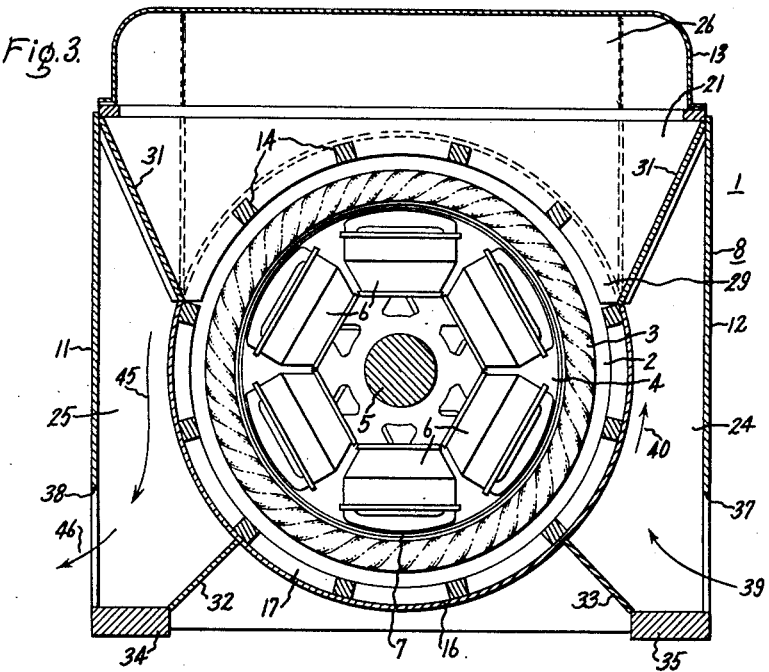
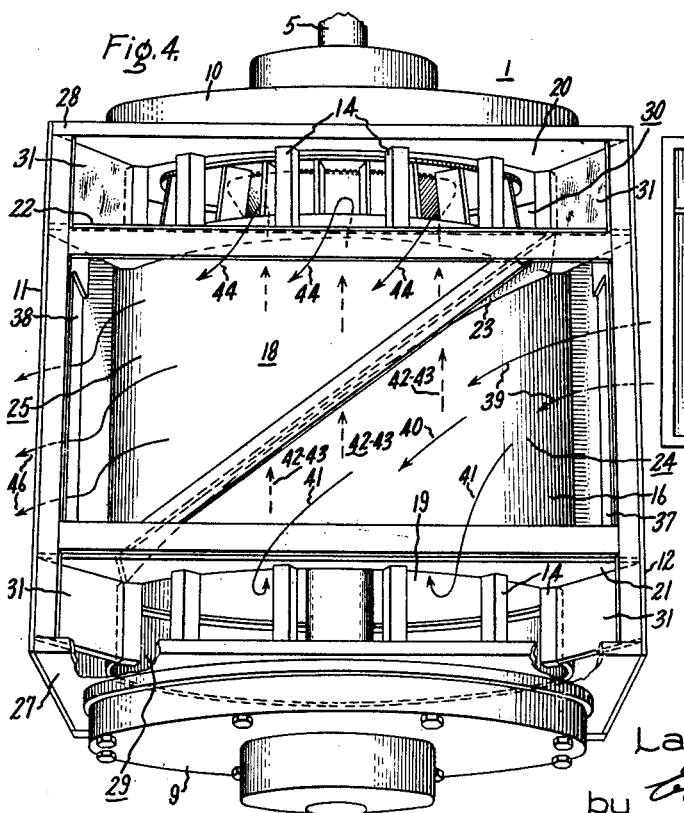
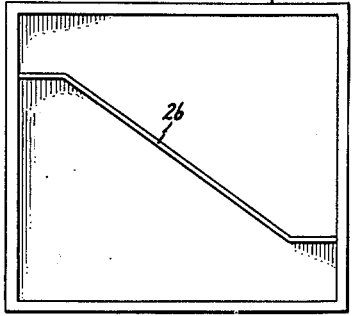
Inventor:
Laurel A. March,
by Ernest H. Britton
His Attorney.

Dec. 2, 1952 L. A. MARCH 2,620,449
DYNAMOELECTRIC MACHINE
Filed Jan. 18, 1951 3 Sheets-Sheet 3
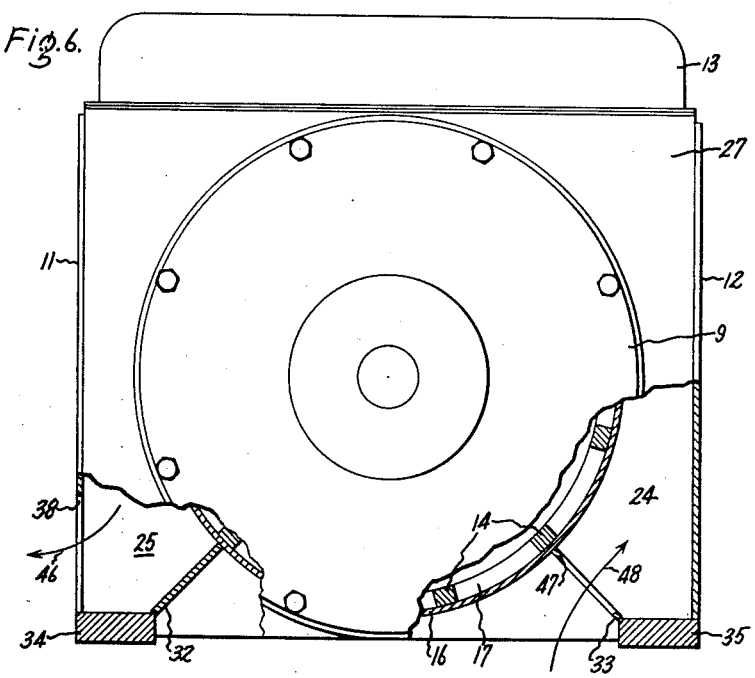
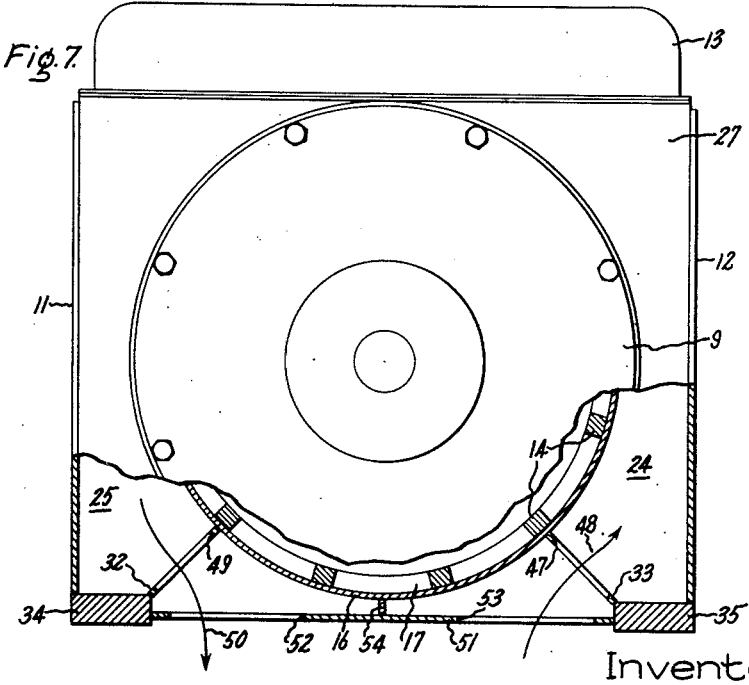
Inventor:
Laurel A. March,
by Ernest F. Britton
His Attorney.

Patented Dec. 2, 1952

2,620,449

UNITED STATES PATENT OFFICE 2,620,449

DYNAMOELECTRIC MACHINE

Laurel A. March, San Jose, Calif., assignor to General Electric Company, a corporation of New York Application January 18, 1951, Serial No. 206,563

5 Claims. (Cl. 310—57)

1

This invention relates to dynamoelectric machines and more particularly to ventilating arrangements for such machines.

In the design of dynamoelectric machines having forced ventilation within the machine, such as by using one or more fans or impellers to draw a gaseous cooling medium into the machine and to circulate it therethrough, it is desirable that the cooling medium be circulated over the maximum surface area within the machine in order to effect maximum heat transfer. It is also desirable to provide a relatively large inlet area for the cooling medium so that the velocity thereof is kept at a low value and to provide a relatively long path which the cooling medium must follow before coming in contact with the machine windings so that the amount of entrained dirt and moisture which enters the internal parts of the machine is minimized.

An object of this invention is to provide an improved ventilating system for dynamoelectric machines.

Another object of this invention is to provide an improved ventilating system for dynamoelectric machines in which the cooling medium is circulated over a maximum surface area.

A further object of this invention is to provide an improved ventilating system for dynamoelectric machines characterized by its simple construction and high cooling efficiency.

A still further object of this invention is to provide an improved ventilating system for a dynamoelectric machine characterized by a relatively large inlet area and a relatively long path which the cooling medium must follow before coming in contact with the internal parts of the machine.

Further objects and advantages of this invention will become apparent and the invention will be better understood by reference to the following description and the accompanying drawing, and the features of novelty which characterize this invention will be pointed out with particularity in the claims annexed to and forming a part of this specification.

In accordance with the preferred embodiment of this invention, a dynamoelectric machine is provided having an outer stator member and a rotor member rotatably arranged therein defining an air gap. An inner cylindrical casing member surrounds the outer periphery of the stator and is spaced therefrom so as to define an axial cooling medium passage over the outer surface of the stator. An outer casing member is provided enclosing the machine and is spaced from

2 the outer surface of the inner casing member thereby defining a circumferential cooling medium channel around the inner casing. The end walls of the outer casing are axially spaced from the stator and respectively define compartments at the ends of the stator communicating with the air gap. Openings are formed in the inner casing respectively communicating with the end compartments. Means are provided for separating the circumferential channel from the end compartments and for axially dividing the channel into two cooling medium passages respectively communicated with the inner casing openings and end compartments. An opening is provided in one side wall of the outer casing communicating with one of the passages for admitting cooling medium thereto for circulation through the passage over the outer surface of the inner casing. Another opening is formed in the other side wall of the outer casing communicating with the other passage for discharging cooling medium from the passage after circulation therein over the outer surface of the inner casing. An impeller is arranged in one of the end compartments and is rotatable with the rotor member. The impeller draws cooling medium from the admitting passage into one of the end compartments, circulates the cooling medium through the air gap and the axial passage over the stator into the other end compartment, and discharges the cooling medium into the other passage for discharge from the machine. Thus, the cooling medium flows over a substantial portion of the outer surface of the inner casing in addition to being drawn through the air gap and axial passage so that maximum heat transfer is effected. Furthermore, the cooling medium has a low velocity by virtue of a relatively large inlet area and must follow a relatively long path before coming in contact with the internal parts of the machine so that entrained dirt and moisture is minimized.

Figure 2:
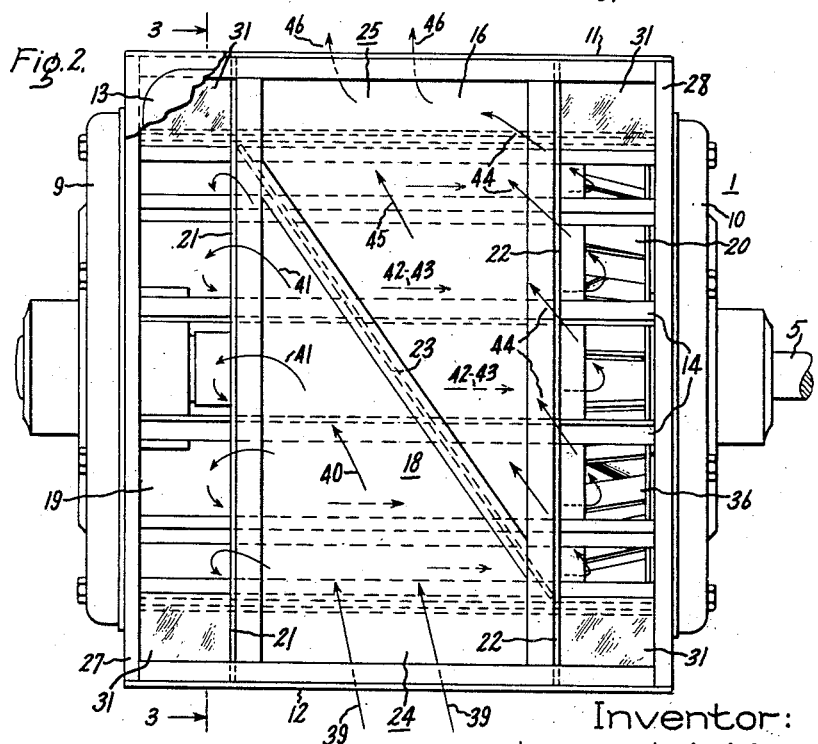

In the drawing, Fig. 1 is a side elevational view, partly in section, showing a dynamoelectric machine provided with an embodiment of the improved ventilating arrangement of this invention; Fig. 2 is a plan view, partly in section, further illustrating the arrangement of Fig. 1; Fig. 3 is a cross sectional view taken along the line 3—3 of Fig. 2; Fig. 4 is a partially broken away plan view in perspective illustrating the flow of cooling medium through the machine; Fig. 5 is a fragmentary view illustrating the cover member of the machine; Fig. 6 is an end view, partly in section, illustrating a modification of this invention; and Fig. 7 is an end view, partly in section, illustrating another modification of this invention.

Referring now to Figs. 1 through 5, there is shown a dynamoelectric machine, generally identified as 1, having an outer stator member 2, of any conventional form, in which appropriate field stator windings 3 are arranged. A rotor member 4, mounted on rotatable shaft 5, is arranged within the stator member 2 and includes a plurality of poles 6 on which suitable windings are arranged. Air gap 7 is defined by the rotor member 4 and the stator member 2. An outer casing member 8 surrounds and encloses the machine and includes end shields 9 and 10, side walls 11 and 12 and cover portion 13 to be hereinafter more fully described. The stator member 2 is mechanically supported within the outer casing 8 by a plurality of longitudinally extending supporting members 14. The shaft 5 is rotatably supported in suitable bearings 15 respectively carried by the end shields 9 and 10.

An inner casing member 16 is provided surrounding the outer periphery of the stator member 2 and secured to the outer surfaces of the supporting members 14. The inner casing 16 thus defines an axial cooling medium passage 17 over the outer surface of the stator 2 and further defines with the outer casing member 8 a circumferential cooling medium channel 18 around the outer surface of the inner casing 16. The end shields 9 and 10 respectively define end compartments 19 and 20 at the ends of the stator 2 and communicate with the air gap 7 and the axial passage 17. Vertical wall portions 21 and 22 extend between the inner casing member 16 and the side walls 11 and 12 of the outer casing member 8 to separate the end compartments 19 and 20 from the peripheral channel 18. A diagonal dividing wall 23 extends between the walls 21 and 22 and serves to divide the cooling medium channel 18 into two cooling medium passages 24 and 25. The cover member 13 is also provided with a diagonal dividing wall 26 cooperating with the wall 23 to complete the division of the channel 18 into passages 24 and 25. The walls 21 and 22, however, do not extend to the top of the cover 13 and thus the passage 24 communicates with the end chamber 19 over the top of the wall 21 and the passage 25 communicates with the end chamber 20 over the top of the wall 22. Referring specifically to Figs. 3 and 4, it will be seen that the inner casing member 16 extends substantially the entire length of the machine and respectively abuts end wall portions 27 and 28 of the outer casing 8. Peripheral openings 29 and 30 are respectively formed in the upper surface of the inner casing member 16 adjacent the ends thereof in order to provide access to the end compartments 19 and 20. Wall portions 31 separate the end compartments 19 and 20 from the passages 24 and 25 and other wall portions 32 and 33 join the inner casing member 16 to the base portions 34 and 35 respectively in order to complete the definition of passages 24 to 25.

A fan 36 is arranged in the compartment 20 and is secured to the shaft 5 for drawing the cooling medium through the machine, as will be hereinafter described. In order to admit the cooling medium to the interior of the machine, an opening 37 is formed in the side wall 12 of the outer casing 8 communicating with the passage 24 and a discharge opening 38 is formed in the side wall 11 communicating with the passage 25. In the embodiment of Figs. 1 through 5, the side wall openings 37 and 38 are formed adjacent the lower portion of the side walls 11 and 12.

In operation, the cooling medium, for example air, enters the opening 37, as shown by the arrow 39, under the influence of the fan 36 and flows through the passage 24 over the outer surface of the inner casing 16, as shown by arrow 40. It then enters the end compartment 19 passing over the wall 21 and through opening 29 in the inner casing 16, as shown by the arrows 41, and then passes axially through the air gap 7, between the poles 6, and through the axial passage 17, as shown by the arrows 42 and 43. After passing through the air gap 7 and the axial passage 17, the fan 36 forces the cooling medium out of the end compartment 20 into the passage 25 through the opening 30 and over the wall 22, as shown by the arrow 44. It then flows through the passage 25 over the outer surface of the inner casing member 16, as shown by the arrow 45 and is discharged through the opening 38, as shown by the arrow 46.

It will now be readily seen that this improved ventilating construction provides an arrangement in which the cooling medium is not only forced through the air gap of the machine, but also flows over a substantial portion of the peripheral surface of the inner casing member thereby effecting maximum heat transfer. It will also be readily apparent that the cooling medium will have a low velocity by virtue of the relatively large inlet area and that entrained dirt and moisture is minimized since the cooling medium must follow a relatively long path before coming in contact with the internal parts of the machine.

While an internal fan 36 is shown and described, it will be readily apparent that this fan may be omitted and the circulation of the cooling medium through the machine be provided by external means, such as an external blower.

Referring now to Fig. 6 in which like parts are indicated by like reference numerals, there is shown a modified form of this invention in which the cooling medium enters the machine from the bottom rather than from the side. In this arrangement, a cooling medium admitting opening 47 is formed in the wall 33, rather than in the side wall 12, so that the cooling medium enters the passage 24 under the influence of the fan as shown by the arrow 48. In Fig. 7 in which like parts are indicated by like reference numerals, there is further shown a modification for both admitting and discharging the cooling medium from the bottom of the machine rather than from the sides. Here, the cooling medium enters the passage 24 through opening 47 formed in wall 33, as shown by the arrow 48 and is discharged through the opening 49 in the wall 32, as shown by the arrow 50. In order to provide for external blowing of the machine if considered desirable, a wall 51 may be arranged below the inner casing member 16 intermediate the supports 34 and 35 in which openings 52 and 53 are respectively formed. A dividing wall 54 is provided to effectively associate opening 53 with opening 47 and opening 52 with opening 49.

It will also be readily apparent that a suitable heat exchanger may be incorporated in the cover member 13 in order to increase the cooling efficiency.

It will now be readily seen that this invention provides an improved ventilating system for a dynamoelectric machine characterized by its simple construction and its greatly increased cooling efficiency.

While I have illustrated particular embodiments of this invention, further modifications and improvements will occur to those skilled in the art. I desire that it be understood therefore that this invention is not limited to the embodiments shown and I intend in the appended claims to cover all modifications which do not depart from the spirit and scope of this invention.

What I claim as new and desire to secure by Letters Patent of the United States is:

1. In a dynamoelectric machine having an outer stator member and a rotor member rotatably arranged therein defining an air gap constituting a first axial cooling medium passage, an inner casing member radially spaced from and surrounding the outer periphery of said stator member thereby defining at least one second axial cooling medium passage, said second axial cooling medium passage being between said stator member and said inner casing, an outer casing member enclosing said machine and spaced from the outer surface of said inner casing defining a circumferential cooling medium channel therearound, said outer casing having end walls axially spaced from said stator respectively defining compartments at the ends of said stator communicating with said first and second axial cooling medium passages, means for dividing said channel into third and fourth cooling medium passages respectively communicating with said end compartments, means for admitting cooling medium to one of said third and fourth passages through said outer casing for circulation of the entire supply of said cooling medium through said one passage and over the outer surface of said inner casing exposed thereto, means for discharging said cooling medium from the other of said third and fourth passages through said outer casing after circulation of the entire supply of said cooling medium through said other passage over the outer surface of said inner casing exposed thereto, inner wall portions at each end of said inner casing between said inner casing and said outer casing, slanting wall portions between said end walls and said inner wall portions, said inner wall portions and said slanting wall portions so cooperating as to cause the entire supply of said cooling medium to flow through a substantial length of each of said third and fourth cooling medium passages, and impelling means arranged in one of said end compartments and rotatable with said rotor member for drawing said cooling medium from said one passage into one of said end compartments, for circulating said cooling medium through said first and second axial cooling medium passages into the other of said end compartments, and for discharging said cooling medium to said other passage.

2. In a dynamoelectric machine having an outer stator member and a rotor member rotatably arranged therein defining an air gap, an inner casing member surrounding the outer periphery of said stator member, an outer casing member enclosing said machine and spaced from the outer surface of said inner casing defining a circumferential cooling medium channel therearound, said outer casing having end walls axially spaced from said stator respectively defining compartments at the ends of said stator communicating with said air gap, said inner casing having openings formed therein respectively communicating with said end compartments, means for dividing said channel into two cooling medium passages respectively communicating with said end compartments and said inner casing openings, inner wall portions at each end of said inner casing between said inner casing and said outer casing, wall portions between said end walls and said inner wall portions substantially tangential to said inner casing, said inner wall portions and said substantially tangential wall portions so cooperating as to cause the entire supply of a cooling medium to flow through substantially the entire length of said two cooling medium passages, means for admitting cooling medium to one of said passages through said outer casing for circulation through said one passage and over the outer surface of said inner casing exposed thereto, means for discharging said cooling medium from the other of said passages through said outer casing after circulation through said other passage over the outer surface of said inner casing exposed thereto, and impelling means arranged in one of said end compartments and rotatable with said rotor member for drawing said cooling medium from said one passage over one of said inner wall portions into one of said end compartments, for circulating said cooling medium through said air gap into the other of said end compartments, and for discharging said cooling medium to said other passage, whereby said cooling medium is forced over a substantial portion of the outer surface of said inner casing member in addition to passing through said air gap.

3. In a dynamoelectric machine having an outer stator member and a rotor member rotatably arranged therein defining an air gap, an inner casing member surrounding the outer periphery of said stator member and spaced therefrom defining an axial cooling medium passage over said stator member, an outer casing member enclosing said machine and spaced from the outer surface of said inner casing defining a circumferential cooling medium channel therearound, said outer casing having end walls axially spaced from said stator respectively defining compartments at the ends of said stator communicating with said air gap and said axial passage, means for dividing said channel into two cooling medium passages respectively communicating with said end compartments, inner wall portions at each end of said casing between said inner casing and said outer casing, wall portions between said end walls and said inner wall portions substantially tangential to said inner casing extending from said inner casing to said outer casing, said inner wall portions and said substantially tangential wall portions so cooperating as to cause the entire supply of a cooling medium to flow into the end compartments only over said inner wall portions, means for admitting cooling medium to one of said two passages through said outer casing for circulation of the entire supply of said cooling medium through said one passage, means for discharging cooling medium from the other of said passages through said outer casing after circulation through said other passage, and impelling means for drawing cooling medium from said one passage into one of said end compartments, for circulating said cooling medium through said air gap and said axial cooling medium passage into the other of said end compartments, and for discharging said cooling medium to said other passage, whereby said cooling medium is forced over a substantial portion of the outer and inner surfaces of said inner casing member in addition to flowing through said air gap.

4. In a dynamoelectric machine having an outer stator member and a rotor member rotatably arranged therein defining an air gap, an inner cylindrical casing member spaced from and surrounding the outer periphery of said stator member, and outer casing member enclosing said machine and spaced from the outer surface of said inner casing defining an annular cooling medium channel therearound, said outer casing having end walls axially spaced from said stator respectively defining compartments at the ends of said stator communicating with said air gap, said inner casing extending between said end walls, inner wall portions parallel to said end walls between said inner casing and said outer casing, slanting wall portions between said end walls and said inner wall portions, said inner wall portions cooperating with said end walls and said slanting wall portions to form openings in the upper surface of said inner casing respectively communicating with said end compartments, said inner wall portions being spaced from the top of said outer casing, a diagonal partition member in said circumferential channel extending between said inner wall portions and between said inner and outer casings for dividing said channel into two cooling medium passages respectively communicating with said inner casing openings, said outer casing having an opening formed therein adjacent the lower portion thereof communicating with one of said passages for admitting cooling medium thereto for circulation of the entire amount of said cooling medium to said one passage and over the outer surface of the inner casing member exposed thereto, said outer casing having another opening formed therein adjacent the lower portion thereof communicating with the other of said passages for discharging said cooling medium therefrom after circulation through said other passage over the outer surface of said inner casing exposed thereto, and impelling means arranged in one of said end compartments and rotatable with said rotor member for drawing said cooling medium from said one passage into one of said compartments, for circulating said cooling medium through said air gap into the other of said end compartments, and for discharging said cooling medium to said other passage whereby said cooling medium is forced over a substantial portion of the outer surface of said inner casing member in addition to passing through said air gap and over the outer periphery of said stator member.

5. In a dynamoelectric machine having an outer stator member and a rotor member rotatably arranged therein defining an air gap, an inner casing member spaced from and surrounding the outer periphery of said stator member, an outer casing member enclosing said machine and spaced from the outer surface of said inner casing defining a circumferential cooling medium channel therearound, said outer casing having end walls axially spaced from said stator respectively defining compartments at the ends of said stator communicating with said air gap and with the space between said inner casing and said stator member, inner wall portions at each end of said inner casing between said inner casing and said outer casing, slanting wall portions between said end walls and said inner wall portions, said end walls cooperating with said inner wall portions and said slanting wall portions to form openings respectively communicating with said end compartments, means for dividing said channel into two cooling medium passages respectively communicating with said inner casing openings, means for admitting cooling medium to one of said passages through said outer casing for circulation of the entire supply of cooling medium through said one passage and over the outer surface of said inner casing exposed thereto, the entire supply of said cooling medium entering one of said end compartments from said one passage over one of said inner wall portions, and means for discharging said cooling medium from the other of said passages through said outer casing after circulation from said one compartment through said air gap and over said stator into the other of said compartments and through said other passage over the outer surface of said inner casing exposed thereto, whereby said cooling medium is circulated over a substantial portion of the outer surface of said inner casing in addition to passing through said air gap and directly over the outer surface of said stator member.

LAUREL A. MARCH.

REFERENCES CITED

The following references are of record in the file of this patent:

UNITED STATES PATENTS

| Number | Name | Date |
|---|---|---|
| 1,269,537 | Holcombe | June 11, 1918 |
| 1,673,012 | Meunier | June 12, 1928 |
| 1,883,288 | Zubaty | Oct. 18, 1932 |
| 2,050,180 | Hurxthal | Aug. 4, 1936 |
| 2,153,386 | Morey | Apr. 4, 1939 |
| 2,157,191 | Sinnett | May 9, 1939 |
| 2,451,219 | Holmgren | Oct. 12, 1948 |
| 2,489,109 | Shildneck | Nov. 22, 1949 |
| 2,522,675 | Hoover | Sept. 19, 1950 |